United States Patent [19]

Conrad

[11] 4,310,223
[45] Jan. 12, 1982

[54] 6 MM ULTRA-FICHE LENS

[75] Inventor: Lawrence H. Conrad, Maplewood, Minn.

[73] Assignee: Minnesota Mining & Manufacturing Company, St. Paul, Minn.

[21] Appl. No.: 82,704

[22] Filed: Oct. 9, 1979

[51] Int. Cl.³ .................................................. G02B 9/60
[52] U.S. Cl. ......................................................... 350/465
[58] Field of Search ........................................ 350/216, 465

[56] References Cited

U.S. PATENT DOCUMENTS

| | | | |
|---|---|---|---|
| 2,130,347 | 9/1938 | Holst et al. | 350/216 X |
| 3,551,031 | 12/1970 | Grey | 350/214 |
| 3,638,996 | 2/1972 | Klein | 350/216 X |
| 3,998,528 | 12/1976 | Fleischman | 350/214 X |
| 4,080,048 | 3/1978 | Kimura | 350/214 |

FOREIGN PATENT DOCUMENTS 647632  2/1979  U.S.S.R. ................... 350/216

*Primary Examiner*—John K. Corbin
*Assistant Examiner*—Scott J. Sugarman
*Attorney, Agent, or Firm*—Cruzan Alexander; Donald M. Sell; John C. Barnes

[57] ABSTRACT

A short focal length high magnification lens system for projecting ultra-fiche images as a large aperture with substantially diffraction limited resolution in the visual spectrum and a compact vertex-to-vertex distance.

5 Claims, 9 Drawing Figures

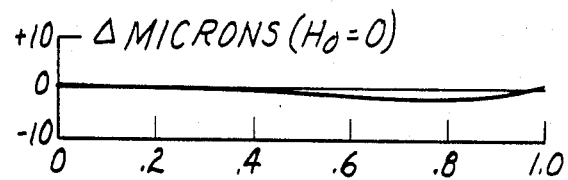
FIG.5  FIG.4
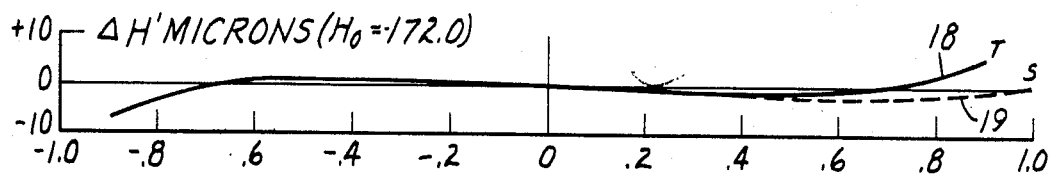
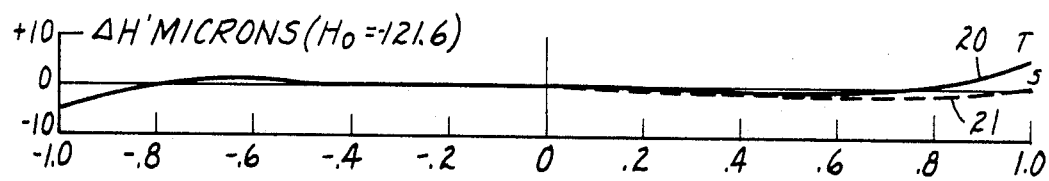
FIG.5A
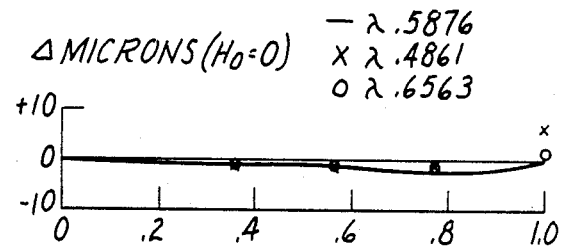
FIG.6
FIG.7
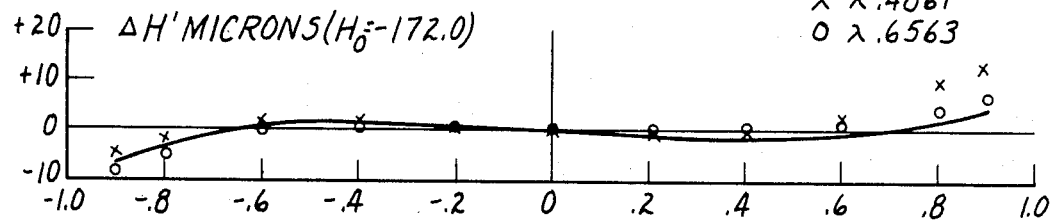
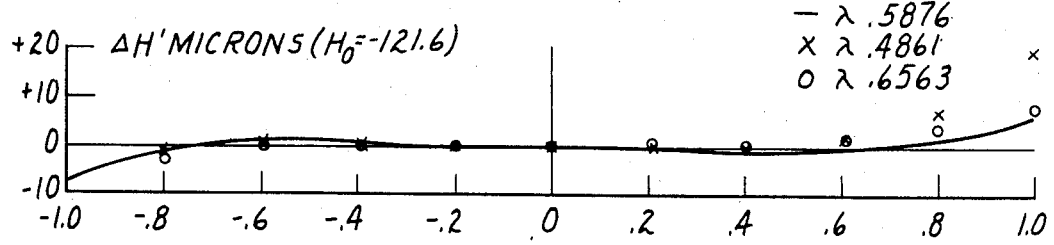
FIG.7A

6 MM ULTRA-FICHE LENS

This invention relates to an improvement in high magnification ultra-fiche lens systems, and in one aspect, to a more compact lens system having a large aperture with substantially diffraction limited resolution in the visual spectrum.

The lens system of the present invention has a 6 mm focal length and has a vertex-to-vertex distance of less than 50 mm. This lens eliminates the necessity of large diameter lens elements on the long or front conjugate of the optical system.

The unique extra long back focal distance allows the lens system to more readily accept the existing light condensing systems on projection apparatus, and also permits greater maneuvering of the glass pressure plates which hold the microimages on the films in a focal plane on most microfilm projection systems.

The exceptionally long radii afford the use of multiple lens blocking holders during manufacture. This in turn eliminates the necessity of fabricating one lens element at a time, which is an obvious saving in manufacturing costs.

The lens of the present invention has a 6 mm focal length using only four air spaces in the lens system, reducing the dependence on metal spacers, which spacers introduce additional tolerances and often result in assembly errors or vagaries such as tilt and space between the lenses.

In the lens system of the present invention eight lens elements are utilized and six of these elements are combined in cemented doublets.

Prior art lens systems for use in ultra-fiche projection have utilized eight or more elements, and of those known, the elements are all air spaced generally and are formed of varying diameters which result in the system having a more complex structure for the lens barrel. An example of the prior art construction is shown in U.S. Pat. No. 3,998,528, issued Dec. 21, 1976 to Andor A. Fleishman. Other examples are U.S. Pat. No. 4,080,048, issued Mar. 21, 1978, to Tadashi Kimura, and U.S. Pat. No. 3,551,031, issued Dec. 29, 1970, to David S. Grey. These high magnification lens systems utilize lens elements of different diameter and increased air spacings, which, as described above, result in increased manufacturing costs because of the increase in the number of air spacings between the elements, and the degree of curvature of the lens elements forbids the production of more than one of the individual lens elements at a time. Further, the edge thickness of some of the lens elements do not readily facilitate the assembly and alignment of the elements. Another distinction of the lens construction of the present invention is that the lens system utilizes only three types of optical glass. Each of these types is readily available and is scratch and stain resistant.

SUMMARY OF THE INVENTION

The ultra-fiche high magnification lens system of the present invention is one constructed of 8 lens elements disposed with respect to each other to include three cemented doublets and four air spaces. The lens system has a 6 mm focal length with a vertex-to-vertex distance of only 47.16 mm. The lens design affords ratioed changes in the focal length to obtain magnifications of 75X and 150X using the same image to object distance as is used at 130X.

DESCRIPTION OF THE ACCOMPANYING DRAWINGS

FIG. 4 is a graph showing the axial spherical abberation traced for F/1.35;

Figure 1:
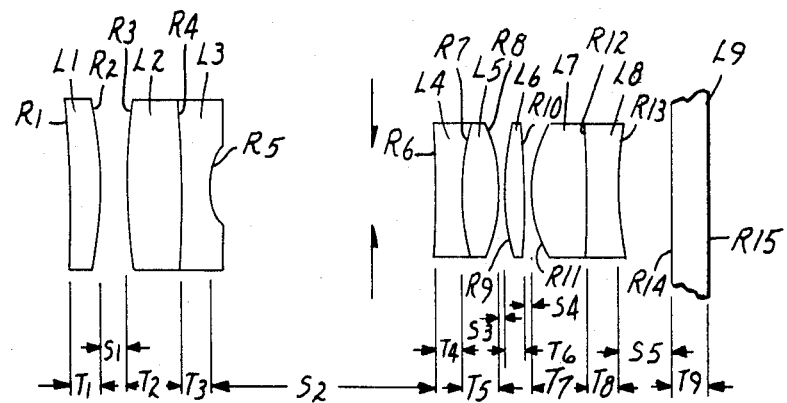
FIG. 1 is a diagrammatic sectional view of a preferred optical system according to the present invention.

FIGS. 5 and 5a are graphs showing the tangential and sagittal oblique ray intercept curve for 100% and 70.7% field of view respectively;

FIG. 6 is a graph showing the axial chromatic ray trace for wavelengths $\lambda 0.5876$, $\lambda 0.4861$, and $\lambda 0.6563$; and FIGS. 7 and 7a are graphs showing the chromatic ray trace for 100% of the field and for 70.7% of the field, for wavelengths $\lambda 0.5876$, $\lambda 0.4861$, and $\lambda 0.6563$, respectively.

DETAILED DESCRIPTION OF THE PRESENT INVENTION

Referring to the drawing, a short focal length lens system for photographing or projecting ultra-fiche images. Typically, when projecting, either the viewing surface is the rear screen of a microfilm reader or the image is directed to a print paper. In the embodiment shown, magnifications of 75X, 130X, and 150X, may be obtained using the same image-to-object distance. This change in the magnification is readily achieved by a change in the ratio of the radii, the thickness of the lens elements and the airspace values in the same proportion to a change in the focal length to achieve larger and smaller magnification values.

In the embodiment illustrated in FIG. 1 a preferred lens system is disclosed which is a 6.17 mm f/1.35, 130X lens.

The lens system comprises eight elements, all formed of glass, and a flat glass element to assure a flat focal plane or image plane. This lens system has unique compactness in that the vertex-to-vertex distance is only 47.16 mm. This structure eliminates the necessity of large diameter lens elements on the front conjugate of the optical system and the diameters of the lens elements are such that the elements forward of the aperture stop have the same diameter and the elements behind the stop are of the same diameter. Such a relationship of the lenses facilitates the assembly and alignment of the lens elements.

Referring now to FIG. 1, the system comprises a first element $L_1$, starting from the front or ray exit side of the system. Lens element $L_1$ is a first positive meniscus lens, air spaced from a negative doublet comprising a lens element $L_2$ which is a positive biconvex element and a negative biconcave element $L_3$. The elements $L_1$, $L_2$, and $L_3$ face the long conjugate of the optical system or the front of the optical system, and all of the lens elements are of the same diameter.

The doublet formed of lens elements $L_2$ and $L_3$ is air spaced from the aperture stop, which is air spaced from the elements to the rear of the aperture stop. The elements to the rear comprise a biconcave element $L_4$ which is cemented to a biconvex element $L_5$ to define a positive doublet which is air spaced from a biconvex positive element $L_6$. The element $L_6$ is air spaced from a positive cemented doublet comprising a biconvex element $L_7$ and a biconcave element $L_8$. Rearward of the element $L_8$ is the glass pressure plate having two planar surfaces behind which is disposed the film plane. The focal plane on the glass plate is spaced a distance from element $L_8$ greater than 5 mm.

Figure 2:
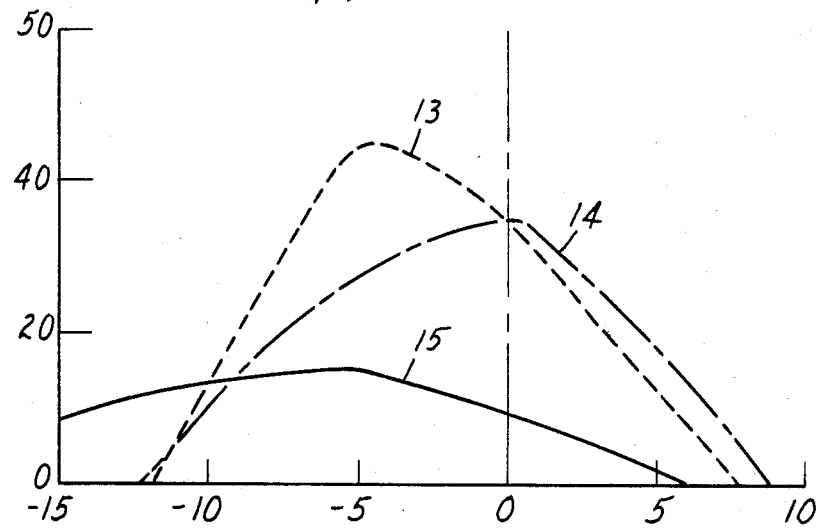
FIG. 2 is a graph showing the diffraction optical transfer function in the tangential wave front.
Figure 3:
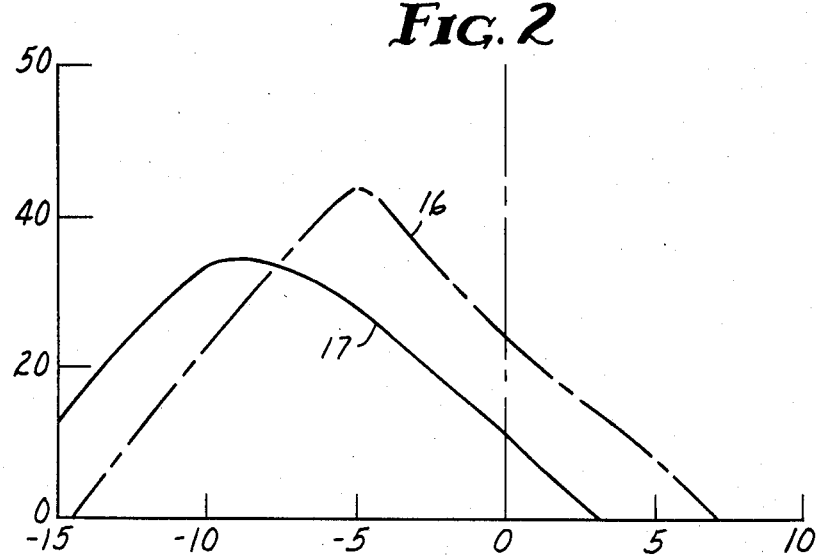
FIG. 3 is a graph showing the diffraction optical transfer function in the sagittal wave front.

FIG. 2 is a graph showing the diffraction optical transfer function (OTF) traces as the lens system is run through focus shifting in microns (horizontal axis) platted against percent of contrast as it is set for 320 cycles per millimeter (c/mm). Three points of the field are given showing the wavelength and their respective contributing weights in this polychromatic trace are $\lambda 0.5876$, 60%, $\lambda 0.4861$, 20%, and $\lambda 0.6563$, 20%. For the tangential wavefronts the wave tracing is shown on axis by the broken line 13, at 70.7% of the field by the dash line 14, and at 100% of the field by the solid line 15. In FIG. 3 the diffraction optical transfer function (OTF) is illustrated for the lens run through focus shifting in microns, platted against percent of contract, as it is set for 320 cycles per millimeter for the sagittal wavefronts at 70.7% of the field as illustrated by the broken line 16, and at 100% of the field as shown by the solid line 17.

FIG. 5 is a graph showing the tangential and sagittal oblique ray intercept curves for 70.7% and 100% of field of view. FIG. 5 shows the ray trace at 100% field with the tangential ray being indicated by the solid line 18 and the sagittal ray being shown by the broken line 19. FIG. 5A illustrates the ray trace at 70.7% of field with the tangential curve being illustrated by the solid line 20 and the sagittal ray being illustrated by curve 21 in the broken line. FIG. 6 shows the axial chromatic ray trace for wave lengths $\lambda 0.5876$; $\lambda 0.4861$, and $\lambda 0.6563$. The code is given on the graph showing the wave lengths respectively by a solid line, an X, and an O. FIG. 7 is a graph showing the chromatic ray trace for 70.7% of the field and FIG. 7A is a graph showing the chromatic ray trace for 100% of field in wavelength $\lambda 0.5876$, $\lambda 0.48161$, and $\lambda 0.6563$.

The optical values of the optical system of FIG. 1 are as follows wherein the radii are given and numbered for the surfaces of the lens elements from front to rear, the thickness of the lens elements are given for each lens element, the air spacings are numbered from front to rear and the values for the glass are given with the respective dispersive V-value and the refractive index $N_d$ are given for each of the elements. The optical values of the optical system of FIG. 1 for a 130X magnification lens with an object to image distance of 838.2 mm are as follows:

TABLE

EFL = 6.17mm
½ ANGLE OF FIELD = 12.58°
B.F. = 6.59mm  FF = −19.12mm
f/1.35 STOP DIAMETER = 7.13mm

| LENS RADII (mm) | THICKNESS (mm) | SPACING (mm) | V | Nd |
|---|---|---|---|---|
| $R_1 = -88.580$ | | | | |
| $L_1$ | $T_1 = 2.650$ | | 26.08 | 1.784701 |
| $R_2 = -43.879$ | | | | |
| | | $S_1 = 2.200$ | | |
| $R_3 = +39.994$ | | | | |
| $L_2$ | $T_2 = 4.560$ | | 26.08 | 1.784701 |
| $R_4 = -93.767$ | | | | |
| $L_3$ | $T_3 = 2.850$ | | 52.29 | 1.517417 |
| $R_5 = +5.573$ | | | | |
| | | $S_2 = 20.02$ | | |
| $R_6 = -69.023$ | | | | |
| $L_4$ | $T_4 = 1.530$ | | 26.08 | 1.784701 |
| $R_7 = +20.506$ | | | | |

TABLE-continued

EFL = 6.17mm
½ ANGLE OF FIELD = 12.58°
B.F. = 6.59mm  FF = −19.12mm
f/1.35 STOP DIAMETER = 7.13mm

| LENS RADII (mm) | THICKNESS (mm) | SPACING (mm) | V | Nd |
|---|---|---|---|---|
| $L_5$ | $T_5 = 3.490$ | | 60.70 | 1.603112 |
| $R_8 = -14.5415$ | | | | |
| | | $S_3 = .100$ | | |
| $R_9 = +21.500$ | | | | |
| $L_6$ | $T_6 = 1.880$ | | 60.07 | 1.603112 |
| $R_{10} = -42.520$ | | | | |
| | | $S_4 = .13$ | | |
| $R_{11} = +10.900$ | | | | |
| $L_7$ | $T_7 = 5.100$ | | 60.07 | 1.603112 |
| $R_{12} = -57.540$ | | | | |
| $L_8$ | $T_8 = 2.800$ | | 26.08 | 1.784701 |
| $R_{13} = +26.860$ | | | | |
| | | $S_5 = 4.550$ | | |
| $R_{14} = \infty$ | | | | |
| $L_9$ | $T_9 = 3.175$ | | | GLASS PLATE |
| $R_{15} = \infty$ | | | | |
| | | IMAGE | | |

APERTURE/STOP IS 5.59mm FORWARD OF LENS $L_4$

The lens elements $L_1$, $L_2$, $L_3$ are all formed of an equal diameter, e.g., 14.1 mm, for the front conjugate, and all of the elements $L_4$, $L_5$, $L_6$, $L_7$, and $L_8$, are of the same diameter, e.g., 12.0 mm to facilitate assembly and alignment of the lenses. The individual lens elements also have excellent edge thicknesses to facilitate assembly.

In the lens of the present invention the lens elements utilize only three types of optical glass, each of which is a readily available type of glass having good characteristics concerning scratch and stain resistance.

I claim:

1. An ultra-fiche high magnification lens system having an equivalent focal length of 6.17 mm and large aperture and comprising eight lens elements, a front portion of the system consisting essentially of three elements, a front positive meniscus lens, air-spaced from a negative doublet consisting of a positive biconvex element cemented to a negative biconcave element, and a rear portion of the system consisting essentially of five elements together with a spaced glass platen, four of said five elements forming two doublets, a first positive doublet air-spaced from a biconvex positive element, air-spaced from the second positive doublet, said elements forming the front portion of the system having the same diameter and the elements forming the rear portion of the system having the same diameter, an aperture stop spaced between said front and rear portions of the system, said second doublet of said rear portion of the system being spaced from the film plane defined on the rear of said platen by a distance greater than 7 mm, and said eight lens elements having a vertex-to-vertex distance of less than 50 mm.

2. An ultra-fiche 130X magnification lens system having an equivalent focal length of 6.17 mm and large aperture and comprising eight lens elements, three elements forming two components in the front portion of the system and consisting of a positive meniscus lens, air-spaced from a negative doublet comprising a biconvex element and a biconcave element, the five remaining elements forming three components which, together with a spaced glass platen, form the rear lens components comprising a first positive doublet comprising a biconcave element and a biconvex element, a positive biconvex component and a second doublet comprising a biconvex element and a biconcave element, said components forming the front portion of the system having the same diameter and the components forming the rear portion of the system having the same diameter with 14 of the 16 surfaces of said elements being produced by multiple lens blocking techniques, an aperture stop spaced between the third and fourth elements of the system, said eighth element being spaced from the film plane greater than 7 mm affording a long back focal length greater than the equivalent focal length, and said eight lens elements having a vertex-to-vertex distance of less than 50 mm.

3. An ultra-high resolution reducing lens of short focal length and large aperture for magnifying an image at a high magnification ratio and having substantially the following specification:

| LENS RADII (MM) | ½ ANGLE OF FIELD = 12.58° f/1.35 STOP DIAMETER | | | |
|---|---|---|---|---|
| | THICKNESS (MM) | SPACING (MM) | V | Nd |
| $R_1 = -88.580$ | | | | |
| $L_1$ | $T_1 = 2.650$ | | 26.08 | 1.784701 |
| $R_2 = -43.879$ | | | | |
| | | $S_1 = 2.200$ | | |
| $R_3 = +39.994$ | | | | |
| $L_2$ | $T_2 = 4.560$ | | 26.08 | 1.784701 |
| $R_4 = -93.767$ | | | | |
| $L_3$ | $T_3 = 2.850$ | | 52.29 | 1.517417 |
| $R_5 = +5.573$ | | | | |
| | | $S_2 = 20.02$ | | |
| $R_6 = -69.023$ | | | | |

-continued

| LENS RADII (MM) | ½ ANGLE OF FIELD = 12.58° f/1.35 STOP DIAMETER | | | |
|---|---|---|---|---|
| | THICKNESS (MM) | SPACING (MM) | V | Nd |
| $L_4$ | $T_4 = 1.530$ | | 26.08 | 1.784701 |
| $R_7 = +20.506$ | | | | |
| $L_5$ | $T_5 = 3.490$ | | 60.70 | 1.603112 |
| $R_8 = -14.5415$ | | | | |
| | | $S_3 = .100$ | | |
| $R_9 = +21.500$ | | | | |
| $L_6$ | $T_6 = 1.88$ | | 60.70 | 1.603112 |
| $R_{10} = -42.520$ | | | | |
| | | $S_4 = .13$ | | |
| $R_{11} = +10.900$ | | | | |
| $L_7$ | $T_7 = 5.100$ | | 60.70 | 1.603112 |
| $R_{12} = -57.540$ | | | | |
| $L_8$ | $T_8 = 2.800$ | | 26.08 | 1.784701 |
| $R_{13} = +26.860$ | | | | |
| | | $S_5 = 4.550$ | | |
| $R_{14} = \infty$ | | | | |
| $L_9$ | $T_9 = 3.175$ | | | GLASS PLATE |
| $R_{15} = \infty$ | | | | |
| IMAGE | | | | |

APERTURE/STOP IS 5.59MM FORWARD OF LENS $L_4$ wherein the first column lists the lens elements starting at the ray exit side of the system, the second column indicating the respective radii in millimeters for the surfaces of the elements, positive values indicating surfaces convex and negative values indicating surfaces concave, the third column lists the thickness in millimeters, the fourth column lists the axial air spacings in millimeters, the fifth column lists the dispersive index V, and the sixth column lists the refractive index Nd of the glass forming the particular elements, the values for the radii, thickness and spacings can be ratioed to vary the magnification from 130X to values between 75X and 150X.

4. An ultra-high resolution lens according to claim 3 wherein said object to image distance remains at 838.2 mm.

5. An ultra-high resolution lens according to claim 4 wherein said effective focal length is 6.17 mm.

* * * * *